United States Patent [19]

Russo

[11] 3,955,800
[45] May 11, 1976

[54] RAILING STRUCTURE

[75] Inventor: Adolph D. Russo, Beachwood, Ohio

[73] Assignee: Russo Ornamental Iron Products, Inc., Bedford Heights, Ohio

[22] Filed: Jan. 29, 1975

[21] Appl. No.: 545,193

[52] U.S. Cl. ............................ 256/59; 403/359; 52/758 R
[51] Int. Cl.² .................................... B01F 13/00
[58] Field of Search ............... 256/59, 65, 24, 21; 403/359, 345, 461, 109; 52/758 H, 656, 475

[56] References Cited
UNITED STATES PATENTS

| | | | |
|---|---|---|---|
| 3,498,589 | 3/1970 | Murdock | 256/21 |
| 3,869,109 | 3/1975 | Russo | 256/59 |

OTHER PUBLICATIONS

Designing With Aluminum Extrusion, Renyolds Metal Co., 1957.

Primary Examiner—Paul R. Gilliam
Assistant Examiner—Doris L. Troutman
Attorney, Agent, or Firm—Meyer, Tilberry & Body

[57] ABSTRACT

A railing construction is disclosed including an extruded aluminum post comprised of concentric inner and outer rectangular tubes. A top railing plate member has a flat plate portion overlying the upper end of the post, and the plate portion has a rectangular aperture therethrough in alignment with the inner tube of the post. An expandable fastener of rectangular cross-section is received in the aperture and inner tube to interconnect the post and plate member. The top railing includes a U-shaped cover extending across the post and releaseably interengaged with the plate member. The railing construction preferably includes a lower railing and vertical pickets in the form of rectangular tubes interconnected with the top and lower railings by means of expandable fasteners.

18 Claims, 7 Drawing Figures

U.S. Patent May 11, 1976 Sheet 1 of 3 3,955,800
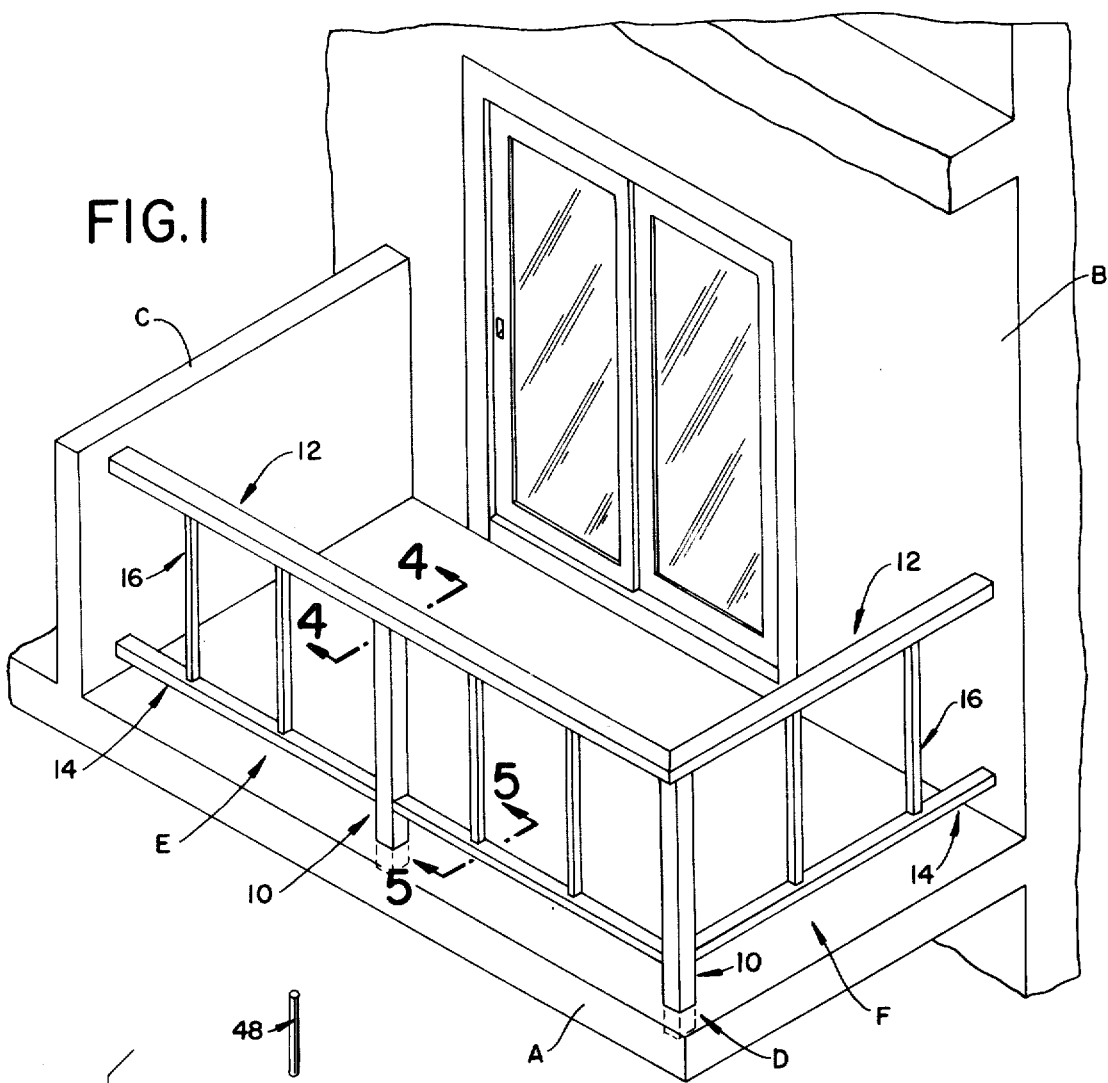
FIG. 1
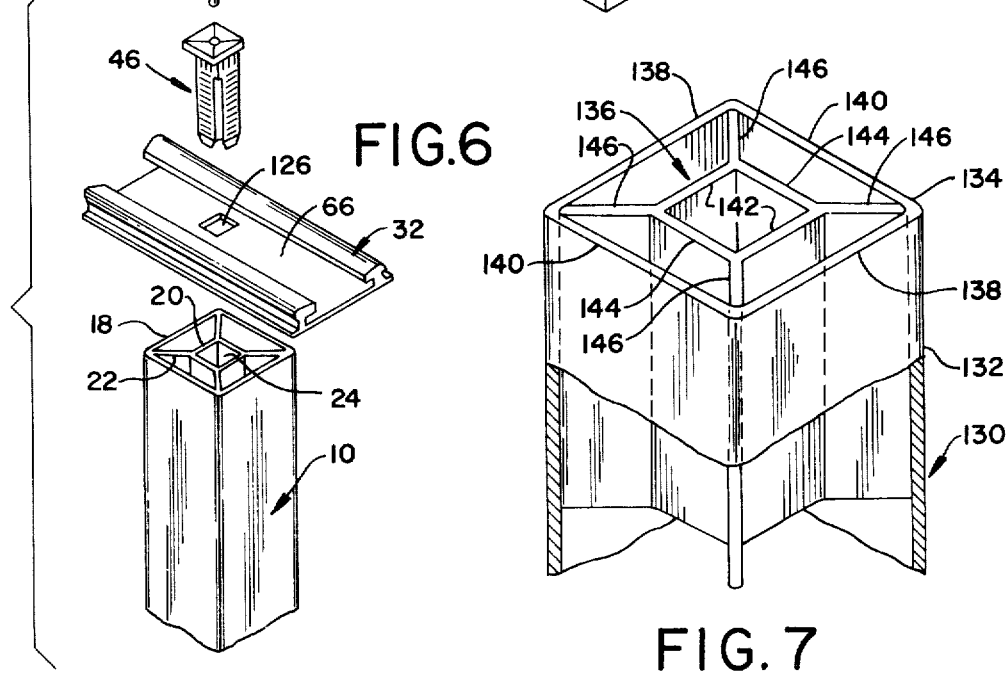
FIG. 6
FIG. 7

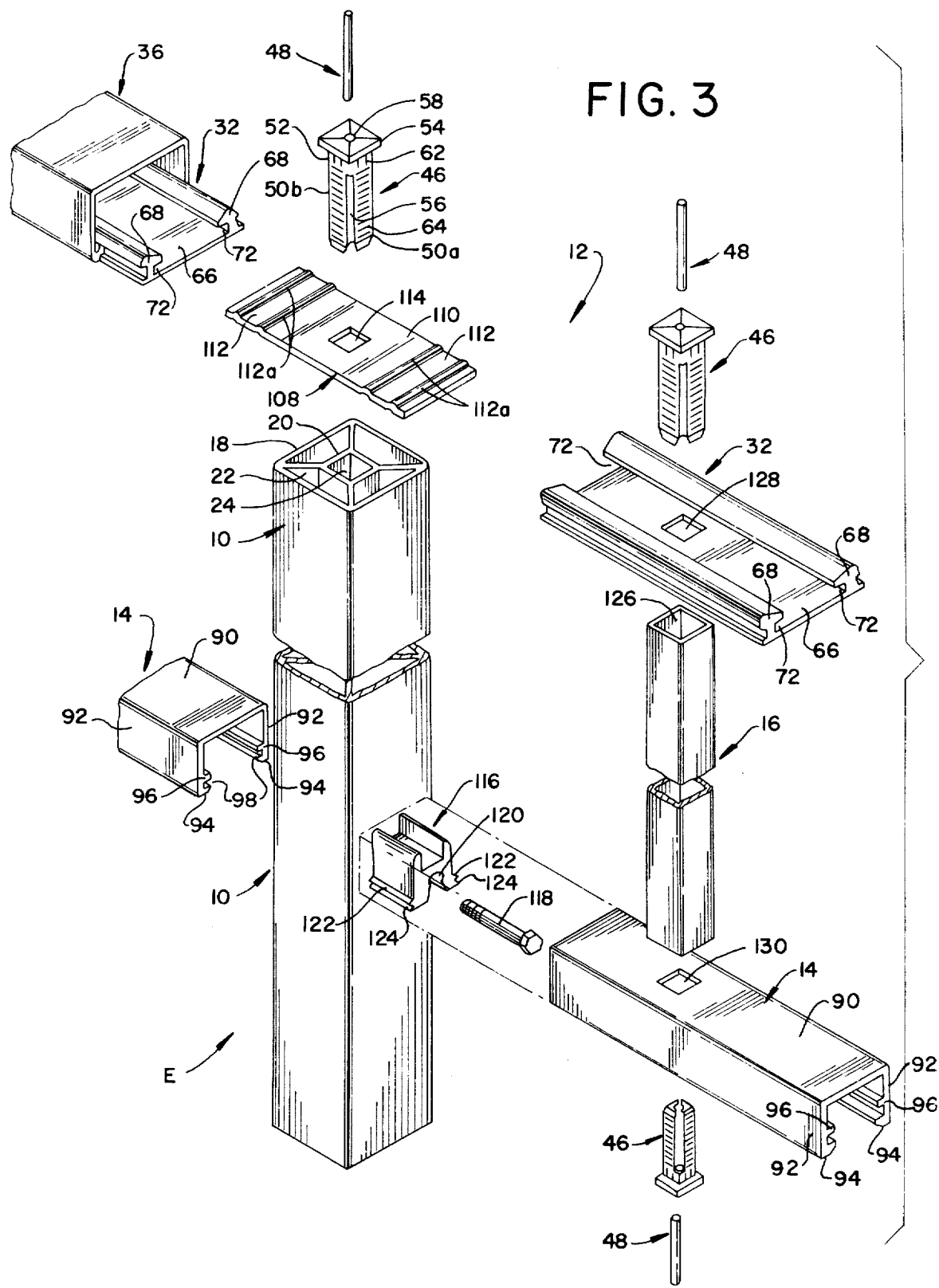

RAILING STRUCTURE

The present invention relates to the art of railings and, more particularly, to railings for use on the edges of balconies or the like.

A number of railing constructions have been provided heretofore for use along porch or balcony edges or along overhead walkways and the like. Generally, such railing constructions include at least one vertical post and a top railing and, most often, a lower railing parallel to the upper railing and interconnected therewith by means of a plurality of vertical picket members. Other railing constructions for such purposes include decorative panels supported either between adjacent vertical posts or between horizontal railing members.

In the construction of railings of the foregoing character, a minimum number of posts, ease of assembly and maintenance, and a desired structural integrity for the assembled unit are factors of primary importance. Heretofore, such railing constructions have required an extremely large number of different structural members and fasteners. Therefore, fabrication and installation is very expensive due to the number of parts required and the time necessary to achieve assembly of the parts. Moreover, once assembled it becomes extremely difficult and time consuming to disassemble components of the railing structure for purposes of maintenance or replacement. Accordingly, such maintenance and replacement operations, if at all possible, are undesirably expensive. Further, special structural components and fastener members, in addition to the basic components of the assembly, may be necessary to achieve a desired structural integrity for the railing construction. This too adds to fabrication costs and assembly time.

In accordance with the present invention, a railing construction is provided which minimizes or overcomes the foregoing disadvantages of such previous railing constructions. More particularly, the railing construction in accordance with the present invention includes a vertical post which is tubular in cross-section, and which is provided at its upper end with an internal member having a polygonal opening therein extending axially of the post. The latter member may be an insert press fitted or otherwise secured within the tubular post, or the member may be fabricated as an integral part of the tubular post.

The railing construction further includes a top railing secured to the post and including a plate portion overlying the upper end of the post and provided with a polygonal opening aligned with the opening in the inner member of the post. The plate portion is secured to the post by means of an expandable fastener having portions disposed in the plate opening and the opening in the inner member. These fastener portions are of complementary cross-sectional configuration and dimension relative to the corresponding opening.

The cross-sectional configuration and dimension of the tubular post can vary from one railing construction to another, and the use of an inner fastener receiving member advantageously enables the top railing and post to be interconnected by the use of a fastener considerably smaller in cross-sectional dimension than the post. Moreover, when the railing assembly includes pickets, the same size fasteners can be employed to attach the pickets to the rails. Further, the polygonal cross-sectional configuration of the openings and fasteners advantageously enables the component parts to be interconnected against relative rotation therebetween, and the use of an expandable fastener component minimizes the time required to achieve the interconnection.

In accordance with one aspect of the invention, the top railing includes a connector plate member or members having a portion overlying the upper end of the post and an outer end or ends extending laterally from the post. The top railing further includes an elongated frame member having an end slotted to receive the outer end of the connector plate. In accordance with another aspect of the innvention, the elongated frame member extends across the upper end of the post and includes a plate portion provided with a polygonal opening by which the frame member is connected to the post by means of the expandable fastener. Prerferably, the top railing further includes a cap member which extends across the upper end of the post, and the cap member and frame member have cooperating interdigitated ribs and grooves by which the cap member is releaseably interengaged with the frame member. Such a cap member rigidifies the frame member against twisting and flexing, covers and thus hides the fastener components, and lends to an overall decorative appearance of the railing construction. Preferably, all of the component parts other than the fasteners are extruded aluminum members. This assures uniformity in dimension and appearance and facilitates part fabrication.

Depending on the use of the railing construction, a lower railing may be provided together with a plurality of vertical picket members between the upper and lower railings. Preferably, the lower railing is an inverted U-shaped aluminum extrusion having an end disposed in abutting relationship with the post and interconnected therewith by means of a connector component bolted to the post. The connector component and the flanges of the channel preferably have cooperating interdigitated ribs and grooves by which the lower rail is snap-locked in place on the connector component. The vertical picket members preferably are tubular aluminum extrusions of polygonal cross-sectional configuration, and the upper and lower rail members are provided with polygonal openings therethrough aligned with each picket axis. The latter openings are of complementary cross-sectional configuration and dimension with respect to the opening through the pickets. Preferably, the rail and picket openings dimensionally correspond in cross-section to the cross-sectional configuration and dimension of the fastener receiving inner member at the upper end of the vertical post, whereby the pickets are adapted to be interconnected with the upper and lower rails by the same size expandable fasteners used to connect the upper rail to the vertical post. This minimizes the number of different parts required for a given railing construction and facilitates the assembly operation in a minimum amount of time and with minimum effort.

Preferably, the expandable fasteners include plugs and wedging pin members adapted to be driven axially thereinto to expand the fasteners into engagement with the railing components. Further, in the preferred fastener construction the pins are adapted to be driven axially through the plugs, thus to release the wedging action of the pins on the plugs, and this enables separation of the fasteners from the railing components should it become necessary or desirable to repair or replace a component part of the railing construction. The removable upper rail caps provide access to the fasteners for this purpose, whereby maintenance of an installed railing construction is facilitated.

Accordingly, an outstanding object of the present invention is the provision of an improved railing construction in which a minimum number of different structural parts are employed.

A further object of the invention is the provision of an improved railing construction which is very simple to assemble and disassemble.

Another object of the invention is the provision of an improved railing construction in which components of the construction are interengaged against relative rotation therebetween by expandable fasteners of polygonal cross-sectional configuration.

Still another object of the provision of an improved railing construction of the foregoing character which enables the use of relatively small expandable fastener structures, and the same size fastener for different components of a given railing construction and for different size components of differernt railing constructions.

Still a further object of the present invention is the provision of a railing construction including at least a vertical post and top railing and in which the vertical post includes an inner member at the upper end thereof provided with a polygonal opening for receiving a correspondingly contoured expandable fastener by which the top railing is interconnected withn the post.

Tthe foregoing objects, and others, will in part be obvious and in part pointed out more fully hereinafter in conjunction with the description of preferred embodiments of the invention illustrated in the accompanying drawings in which:

FIG. 1 is a perspective view of a railing construction assembled in accordance with the present invention to provide a corner railing for a balcony or the like;

FIG. 3 is an exploded perspective view of another portion of the railing construction shown in FIG. 1;

FIG. 6 is an exploded perspective view of a modification of the post and top rail construction shown in FIG. 3; and, FIG. 7 is a perspective view showing a modification of the vertical post member of a railing construction in accordance with the present invention.

Figure 2:
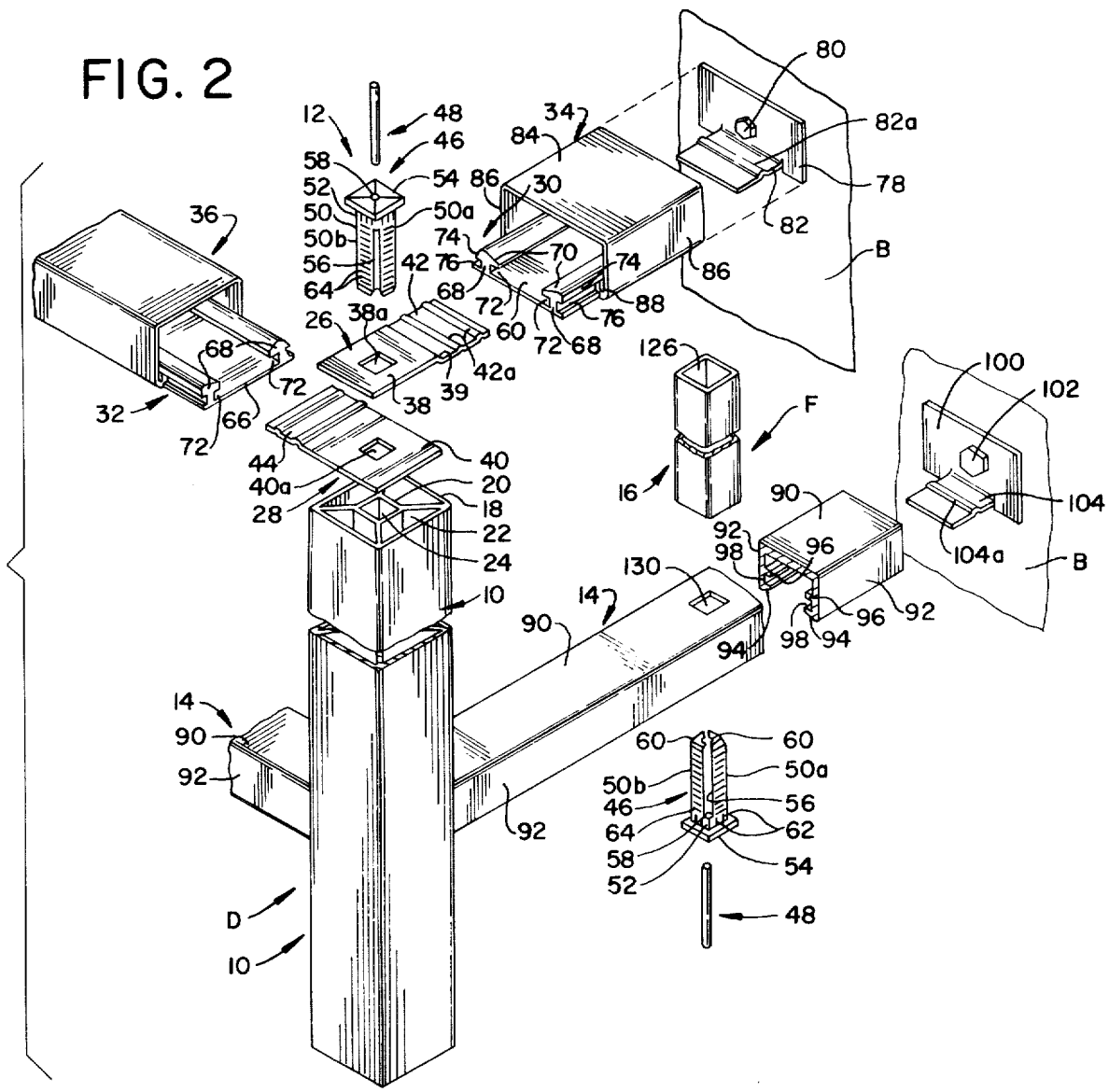
FIG. 2 is an exploded perspective view of the corner portion of the railing construction shown in FIG. 1.
Figure 4:
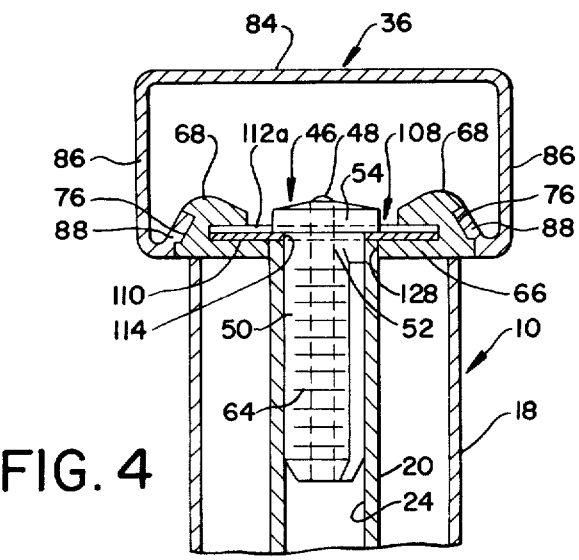
FIG. 4 is a cross-sectional view taken along line 4—4 in FIG. 1.

Referring now in greater detail to the drawings wherein the showings are for the purpose of illustrating preferred embodiments of the invention only, and not for the purpose of limiting the invention, a railing construction is shown in FIG. 1 in connection with a corner porch or balcony of a building. For purposes of illustration only, the balcony is shown as having a horizontal concrete floor A extending between a vertical wall B of the building and a vertical partition wall C extending outwardly from wall B. The railing construction includes a corner section D, a front section E extending from corner D to partition wall C, and a side section F extending from the corner section D to building wall B. The railing construction includes vertical posts 10 having lower ends secured to floor A such as by embedment in the concrete thereof, horizontal top rails 12, horizontal bottom rails 14 and vertical pickets 16 between the top and bottom rails.

The structure of the component parts of the railing construction and the structural interrelationship therebetween is shown in detail in FIGS. 2-5 of the drawing. Referring to the latter Figures, vertical posts 10 are tubular aluminium extrusions. More particularly, each vertical post includes concentric outer and inner tubes 18 and 20, respectively, integrally interconnected by radially extending webs 22. Preferably, tubes 18 and 20 are square in cross-section having corresponding pairs of parallel sides, and webs 22 extend between corresponding corners of the tubes. Inner tube 20 defines a fastener receiving member, and the tubular configuration of inner member 20 provides a square opening 24 extending vertically of the post for this purpose, as set forth more fully hereinafter.

As seen in FIG. 2 showing corner portion D of the railing construction, top railing 12 is comprised of a pair of connector plates 26 and 28, a pair of elongated frame members 30 and 32, and a pair of cap members 34 and 36. Components 26, 30 and 34 define the top railing for section F shown in FIG. 1, and components 28, 32 and 36 define the top railing for section E. Connector plates 26 and 28 include flat plate portions 38 and 40, respectively, overlying the upper end of post 10. Further, connector plates 26 and 28 include outer end portions 42 and 44, respecitvely, extending horizontally from corner post 10 and the direction of the corresponding rail section. Plate portions 38 and 42 of connector plate 26 are offset as indicated by the numeral 39 for plate portions 42 and 44 to be coplanar. Plate portions 38 and 40 of the two connector plates are provided with corresponding square openings 38a and 40a extending therethrough and which are complementary in cross-sectional configuration and dimension with opening 24 in tube 20.

Connector plates 26 and 28 are adapted to be attached to corner post 10 by means of an expandable fastener assembly including a fastener plug 46, preferably of cast aluminum, and a steel drive pin 48. Each fastener plug 46 includes a leg portion 50 adapted to extend through openings 38a and 40a and into openings 24 in tube 20. The fastener plug further includes a portion 52 disposed in openings 38a and 40a when the component parts are assembled. Plug portions 50 and 52 correspond in cross-sectional dimension and contour with the corresponding opening in which they are received. Accordingly, in the embodiment disclosed plug portions 50 and 52 are square in cross-section. Plug 46 further includes a head 54 which engages the outer surface of plate portion 38 of connector plate 26 to limit the extent of plug insertion.

Leg portion 50 of plug 46 is divided into a pair of leg members 50a and 50b by means of a slot 56 which extends diagonally through portion 50. Legs 50a and 50b are radially expandable with respect to the axis of the plug and, for this purpose, the plug is provided with a longitudinally extending bore 58 adapted to receive cylindrical drive pin 48. The portion of bore 58 extending through plug portion 52 and head 54 is of a diameter having a tight fit with pin 48, whereby the pin must be forceably driven into the bore, such as by a hammer. In the embodiment shown, the width of slot 56 between legs 50a and 50b is less than the diameter of pin 48, and the opposed inner faces of legs 50a and 50b are provided with longitudinally extending arcuate pin guiding recesses 60. The latter recesses taper inwardly of the fastener axis from the ends adjacent plug portion 52 toward the free ends of the fastener legs to provide for pin 48 to radially displace legs 50a and 50b when the pin is driven therebetween.

It will be appreciated from the foregoing description that the ends 38 and 40 of corner plates 26 and 28 are readily interconnected with corner post 10 by aligning openings 38a and 40a with inner tube opening 24, inserting plug 46 through openings 38a and 40a and into tube opening 24 until head 54 abuts plate portion 38, and then driving pin 48 into the plug. The square contour of plug portions 50 and 52 cooperates with the corresponding plate and tube openings to prevent rotation of the fastener plug and connector plates relative to corner post 10 about the axis of inner tube opening 24. The cross-sectional dimensions of plug portion 52 and openings 38a and 40a preferably provide for a tight fit therebetween, and plug portion 52 preferably is provided with longitudinally extending ribs 62 which are adapted to bite into the inner faces of openings 38a and 40a for this purpose. The square contour of plug portion 50 provides for interengagement thereof facially with the inner surfaces of the walls of inner tube 20, and radial expansion of leg portions 50a and 50b in tube opening 24 causes the outer surfaces of the legs to interengage with the tube walls against axial separation. Preferably, legs 50a and 50b are provided with transversely extending sharp ribs 64 which are adapted to bite into the inner surfaces of the walls of tube 20 to enhance the interengagement therebetween against separation.

Frame members 30 and 32 of the top rails 12 of railing sections E and F are of identical structure, whereby only one of the frame members will be described in detail. In this respect, with reference to frame member 30 shown in FIG. 2, the latter is preferably ana aluminum extrusion including a flat plate portion 66 and a pair of ribs 68 along the opposite side edges thereof and projecting upwardly therefrom. Plate portion 66 and ribs 68 are longitudinally coextensive, and ribs 68 include a laterally inwardly extending lip portion 70 spaced above plate portion 66 to define longitudinally extending recesses 72 for receiving end portion 42 of connector plate 26. Preferably, end portion 42 of the connector plate is provided with laterally extending detents or offsets 42a contoured to provide for a tight fit between the end of the connector plate and recesses 72 of the frame member. Ribs 68 further include laterally outwardly extending projections 74 which cooperate with plate portion 66 to define longitudinally extending recesses 76 facing outwardly of the frame member for the purpose set forth hereinafter.

As seen in FIGS. 1 and 2, the end of railing section F opposite corner post 10 is interconnected with building wall B. In the embodiment shown, this interconnection is achieved by means of an L-shaped wall connector bracking having a leg 78 suitably attached to wall B such as by means of a bolt 80, and a horizontal leg 82 which is adapted to be received in frame member recesses 72 at the corresponding end of frame member 30. Preferably, leg 82 is provided with detents 82a similar to and for the same purpose as detents 42a on connector plate 26. Accordingly, frame member 30 is rigidly supported in a horizontal disposition between post 10 and wall B when assembled therewith.

Cap members 34 and 36 of the top railing are of the same structure, whereby like numerals appear in the drawings with regard thereto. Each cap member preferably is a U-shaped extruded aluminum chananel disposed with the open side thereof facing downwardly wiith respect to the corresponding frame member of the upper railing. The channel member includes a web 84 and a pair of flanges 86 extending along the opposite side edges thereof and downwardly therefrom. The lower ends of flanges 86 terminate in corresponding lateraly inwardly directed projections 88 which are longitudinally coextensive therewith and which are of a contour for mating engagement with the corresponding recess 76 in frame member 30. Accordingly, recesses 76 and projections 88 define cooperating interdigitated snap-locking structures by which the cap members are releaseably interengaged with the corresponding top rail frame member. The cap members are of course longitudinally coextensive with respect to the corresponding frame member and, when snapped in place, the cap members cover the frame members, the expandable fastener and connector plates at the corner post, and the connector bracket at wall B.

Lower railings 14 preferably are inverted U-shaped extruded aluminum channels of identical construction including a web 90 and a pair of flanges 92 extending along the longitudinal side edges thereof and downwardly therefrom. The lower ends of flanges 92 are provided with inwardly directed projections 94 and the inner surfaces of the webs are provided with longitudinally extending ribs 96. Projections 94 and ribs 96 define longitudinally extending recesses 98 by which the bottom rail is attached to wall B and corner post 10. The connection to wall B is similar to that of the top rail and, in this respect, an L-shaped mounting bracket is employed which includes a leg 100 fastened to wall B such as by means of a bolt 102, and a horizontally exgending leg 104 received in recesses 98 at the corresponding end of the lower railing. Leg 104 preferably is provided with a laterally extending detent 104a to achieve a tight fit between the bracket and recesses 98.

The manner in which the opposite end of lower rail 14 is interconnected with corner post 10, and the manner in which picket members 16 are interconnected with the top and bottom rails will become apparent in connection with the following description of railing section E shown in FIGS. 1 and 3 of the drawing. Referring to the latter Figures, vertical post 10 of railing section E is identical in structure to vertical post 10 of corner section D. In railing section E, however, the top railing extends longitudinally across the vertical post from corner section D to wall C. Accordingly, the top raialing 12 for section E is comprised of a pair of frame members 32 and a single connector plate 108 at the upper end of post 10. Frame members 32, as mentioned hereinabove, are identical in structure to frame member 30.

Connector plate 108 includes a flat intermediate portion 110 overlying the upper end of post 10, and opposite ends 112 structurally similar to ends 42 and 44 of connector plates 26 and 28 described hereinabove. In this respect, plate ends 112 are each received in the longitudinally extending recesses 72 of the corresponding frame member 32 and are provided with laterally extending detents 12a to enhance a tight engagement therewith. Further, in a manner similar to thatt described hereinabove, plate portion 110 is provided with a square opening 114 aligned with opening 24 of inner tube 20 in post 10 to receive an expandable fastener plug 46 by which plate 108 and thus the upper railings of section E are interconnected with the post.

The end of the frame member 32 disposed adjacent wall C is interconnected therewith in the same manner that the end of frame member 30 is connected to wall B as shown in FIG. 2. Further, it will be appreciated that cap member 36 extends continuously from corner section D across the vertical post of section E to wall C and is releasably interconnected with frame members 32 in the manner described hereinabove with regard to cap member 34. The interconnected relationship of the component parts at the top of post 10 in railing section E is shown in cross-section in FIG. 4, and it will be appreciated that a similar cross-sectional configuration exists at the corner post of corner section D except for the fact that two connector plates are employed at the corner rather than one.

Figure 5:
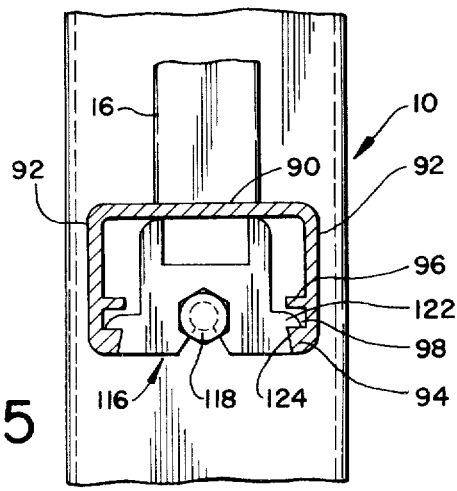
FIG. 5 is a cross-sectional view taken along line 5—5 in FIG. 1.

The lower railing 14 of section E between vertical post 10 and wall C is connected to the latter wall in the same manner as that shown for the connection of flower railing 14 to wall B in FIG. 2. The manner in which the lower railings are connected to vertical posts 10 both at corner section D and in railing section E is shown in FIG. 3 with respect to vertical post 10 of railing section E. In this respect, a connector block 116 is attached to a sidewall of post 10 such as by means of a machine bolt 118. Connector block 116 includes an opening 120 therethrough for bolt 118, and the wall of post 10 can, for example, be provided with a threaded aperture cooperatively interengaging with threads on bolts 118 to mount connecting block 116 to the post. The lower end of block 118 is provided on its opposite sides with longitudinally extending projections 122 and recesses 124 therebeneath contoured to receive and cooperably interengage with projections 94 on flanges 92 of the channels defining the lower rails, as shown in FIG. 5. Accordingly, recesses 124 and projections 94 define cooperating interdigitated locking structures by which the lower rail channels are adapted to be snap-locked in place with respect to connector blocks 116.

The manner in which vertical picket members 16 are interconnected with the upper and lower railings is also best seen in FIG. 3. In this respect, each of the picket members 16 is preferably a tubular aluminum extrusion of square cross-section having an opening 126 therethrough. At the desired locations for the picket members, the frame member of the upper railing and web 90 of the lower railing channel are provided with vertically aligned square openings 128 and 130, respectively, to receive expandable fasteners of the character described hereinabove. It will be appreciated, however, that the picket members are interconnected with the upper and lower railings by inserting fastener plugs 46 through the railing openings and into the corresponding end of the picket member and then expanding the legs of the fastener plug by driving the wedging pin into the plug.

It will be noted that at this point the vertical posts of the railing system are of considerably larger cross-sectional dimension than the picket members and that the use of an inner tubular member in the post as shown in the drawings advantageously enables the top railing to be connected to the post and the picket members to the upper and lower railings through the use of a common size expandable fastener. Moreover, the railing and post and the railings and picket members are advantageously interconnected against relative rotation therebetween about the axes of the fasteners as a result of the cross-sectional configuration of the openings and expandable fasteners.

It will be appreciated from the foregoing description of the structure and structural interrelationship of the component parts of the railing construction that the parts are readily interconnectable with one another to minimize assembly time and that once interconnected all of the expandable fasteners, connector plates and brackets and connector blocks are covered so that the railing construction has an overall pleasing appearance to the eye. Moreover, if disassembly is necessary or desirable for replacement or maintenance purposes, the cap members of the upper railing are readily removable, and cylindrical pins 48 of the expandable fastener assemblies can be driven axially through the corresponding fastener plug, whereby the wedging action thereof against the legs of the fastener is removed. This frees the fasteners for removal and accordingly facilitates the ease of disassembly.

While connector plates 108 are shown in connection with vertical post 10 of railing section E, it will be appreciated that the frame member of upper railing 12 can be directly connected to vertical post 10 so as to extend continuously from corner section D to wall C. In this case, as shown in FIG. 6, plate portion 66 of a continuous frame member 32 would be provided with a square opening 126 for receiving expandable fastener 46 to interconnect the frame member and post in the manner described hereinabove.

In the embodiments described hereinabove, the vertical post is defined by an extrusion in which the inner and outer tubular members are integrally interconnected and longitudinally coextensive. This advantageously enables the use of small expandable fasteners with the post to achieve interconnection of the top railing therewith as herein described and enables the use of a common size expandable fastener for the latter purpose and for interconnecting the picket members with the upper and lower railings. These advantages, however, can be readily achieved more economically by providing for the inner tubular member defining the fastener receiver to be an insert suitably interconnected with the tubular post at the upper end thereof. For example, as shown in FIG. 7, the vertical post, designated 130, can be defined by a tubular member 132 having an upper end 134, and the fastener receiver can be in the form of an insert 136 received in the upper end of member 132.

In the embodiment shown in FIG. 7, tubular member 132 has opposed pairs of parallel walls 138 and 140, and insert 136 includes a tubular body portion defined by opposed pairs of parallel walls 142 and 144. The insert further includes webs 146 extending radially from the corners between adjacent sides 142 and 144 and into the corners between adjacent slides 138 and 140 of member 132. Insert 136 may be defined by an aluminum extrusion, and the radial length of webs 146 provides for the longitudinally extending outer edges thereof to frictionally engage with the member 132 in the corners between adjacent walls thereof. It will be appreciated, of course, that such a frictional engagement would be sufficient to prevent unintentional and undesirable withdrawal of the insert from tubular member 132, such as would be defined by a force fit between the tubular member and insert. Alternatively, the insert could be rigidly fastened in place such as by welding, for example, However, the use of a force fit considerably expedites the assembly operation and the cost of assembly.

It will be appreciated that insert 136 would have an axial length relative to member 132 sufficient to receive the leg portion of the expandable fastener. While an insert is shown which corresponds in cross-sectional configuration to that provided by the integral extrusion shown and described herein, it will be appreciated that the insert could be of any suitable structure for interengagement with the outer tubular member to achieve the desired result. It is only necessary that the insert have a polygonal opening therethrough or thereinto to receive the expandable fastener in the manner and for the purpose described herein.

While considerably emphasis has been placed herein on the fact that the vertical posts, inner tubular fastener receiving members and fastener plugs are of square cross-sectional configuration, it will be appreciated that the post can be of any desired cross-sectional contour and that the openings for receiving the fastener and the fastener plug can have a polygonal cross-sectional configuration other than square. Moreover, while the fastener plug and the openings therefor are shown and described as having the same cross-sectional contour and size, it will be appreciated that it is only necessary for the plug receiving openings to be complementary with respect to the corresponding portion of the fastener plug received therein. Still further, while a particular expandable fastener structure is illustrated and described, it will be appreciated that other expandable fastener assemblies can be employed without departing from the principles of the present invention.

Many modifications of the various components of the preferred embodiments disclosed herein will be readily apparent upon reading the foregoing description and, accordingly, it is to be distinctly understood that the foregoing descriptive matter is to be interpreted merely as illustrative of the present invention and not as a limitation.

What is claimed is:

1. A railing construction comprising, at least one vertical post and a top railing, said post being tubular and having an inner surface and an upper end, a fastener receiving member supported within said post at said upper end, said fastener receiving member including a polygonal opening spaced radially inwardly of said inner surface and having a vertical axis, said top railing including horizontal plate means, said plate means including a horizontally planar plate portion extending across said upper end of said post and in overlying engagement therewith, said planar plate portion having a polygonal opening therethrough in alignment with said opening in said fastener receiving member, and expandable fastener means extending through said opening in said plate portion and into said opening in said fastener receiving member to interconnect said top railing and post, said fastener means having a polygonal portion disposed in each of said openings and of complementary cross-sectional configuration and size with respect to the corresponding opening.

2. The construction according to claim 1, wherein said plate means includes a plate member and a frame member, said plate member including said plate portion overlying said upper end of said post and an end portion extending horizontally from said post and having opposite side edges, said frame member having an end adjacent said post and longitudinally opening grooves in said end receiving said side edges of said plate member.

3. The construction according to claim 2, wherein said top railing further includes a cap member, said cap member and said frame member having cooperating interdigitated locking means interconnecting said cap member and said frame member, said cap member extending across said upper end of said post.

4. The construction according to claim 1, wherein said plate means is said one piece frame member including a plate portion extending across said upper end of said post and portions extending horizontally therefrom, said top railing further including a cap member, and said cap member and frame member having interdigitated locking means integral therewith and interconnecting said cap member and said frame member, said cap member extending across said upper end of said post.

5. The construction according to claim 1, wherein said post is a metal extrusion including inner and outer tubular members integrally interconnected with one another, said inner tubular member defining said fastener receiving member.

6. The construction according to claim 1, wherein said fastener receiving member is an insert positioned in said upper end of said tubular post in tight frictional interengagement therewith.

7. The construction according to claim 6, wherein said insert includes a tubular portion and longitudinally extending flanges projecting radially outwardly from said tubular portion into engagement with said tubular post, said tubular portion defining said polygonal opening in said fastener receiving member.

8. A railing construction comprising, at least one vertical post and a top railing, said post being tubular and having an inner surface and an upper end, a tubular fastener receiving member in said post at said end and having a rectangular opening therein concentric with said tubular post, means radially interconnecting said receiving member and said inner surface of said tubular post to support said receiving member in said post, said top railing including horizontal plate means, said plate means including a horizontally planar plate portion extending across said upper end of said post in overlying engagement therewith and having a rectangular hole therethrough in alignment with said opening in said receiving member, a one piece expandable fastener plug extending through said hole and into said opening to interconnect said top railing and post, said fastener plug having rectangular portions disposed respectively in said hole and opening and of complementary cross-sectional dimension with respect thereto, said portion of said plug in said opening having legs radially displaceable relative to said portion of said plug in said hole, and a wedging member between said legs anad wedging said legs against the inner surface of said opening in said fastener receiving member.

9. The construction according to claim 8, wherein said tubular fastener receiving member includes opposed pairs of parallel walls defining said rectangular opening, said means radially interconnecting said receiving member and said inner surface including a plurality of ribs integral with said receiving member and extending radially outwardly from the corners between adjacent ones of said walls.

10. The construction according to claim 9, wherein said ribs have radially outer ends integral with said inner surface of said tubular post.

11. The construction according to claim 10, wherein said plate means includes a plate member and a frame member, said plate member including said portion overlying said upper end of said post and an end portion extending horizontally from said post and having opposite side edges, said frame member having an end adjacent said post and longitudinally opening grooves in said end receiving said side edges of said plate member.

12. The construction according to claim 11, wherein said top railing further includes a cap member, said cap member and said frame member having cooperating interdigitated locking means interconnecting said cap member and said frame member, said cap member extending across said upper end of said post.

13. The construction according to claim 10, wherein said plate means is a one piece frame member including said plate portion extending across said upper end of said post and portions extending horizontally therefrom, said top railing further including a cap member and frame member having interdigitated locking means integral therewith and interconnecting said cap member and said frame member, said cap member extending across said upper end of said post.

14. The construction according to claim 9, wherein said ribs have radially outer ends having longitudinally extending edges frictionally engaging said inner surface of said tubular post to innterconnect said receiving member therewith.

15. The construction according to claim 14, wherein said inner surface of said tubular post is rectangular in cross-section and said longitudinal edges of said ribs engage said inner surface in the corners thereof.

16. The construction according to claim 15, wherein said plate means includes a plate member and a frame member, said plate member including said portion overlying said upper end of said post and an end portion extending horizontally from said post and having opposite side edges, said frame member having an end adjacent said post and longitudinally opening grooves in said end receiving said side edges of said plate.

17. The construction according to claim 16, wherein said top railing further includes a cap member, said cap member and said frame member having cooperating interdigitated locking means interconnecting said cap member and said frame member, said cap member extending across said upper end of said post.

18. The construction according to claim 15, wherein said plate means is a one piece frame member including said plate portion extending across said upper end of said post and portions extending horizontally therefrom, said top railing further including a cap member, and said cap member and frame member having interdigitated locking means integral therewith and interconnecting said cap member and said frame member, said cap member extending across said upper end of said post.

* * * * *